(12) United States Patent
Furuya

(10) Patent No.: US 10,232,468 B2
(45) Date of Patent: Mar. 19, 2019

(54) ROTARY TABLE DEVICE AND LASER MACHINING SYSTEM

(71) Applicant: Fanuc Corporation, Yamanashi (JP)

(72) Inventor: Yoshitake Furuya, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/787,422

(22) Filed: Oct. 18, 2017

(65) Prior Publication Data

US 2018/0141155 A1 May 24, 2018

(30) Foreign Application Priority Data

Nov. 24, 2016 (JP) .................. 2016-227881

(51) Int. Cl.
| | |
|---|---|
| *B23K 26/00* | (2014.01) |
| *B23K 26/02* | (2014.01) |
| *B23K 26/08* | (2014.01) |
| *B23K 26/70* | (2014.01) |
| *B23K 26/36* | (2014.01) |

(52) U.S. Cl.
CPC ...... *B23K 26/0884* (2013.01); *B23K 26/0823* (2013.01); *B23K 26/0892* (2013.01); *B23K 26/36* (2013.01); *B23K 26/702* (2015.10)

(58) Field of Classification Search
CPC . B23K 26/08; B23K 26/0821–26/0823; B23K 26/0884; B23K 26/0892; B23K 26/352; B23K 26/36; B23K 26/34; B23K 26/342; B23K 26/702; B23K 37/02; B23K 37/024; B23K 37/0247; B23K 37/04; B23K 37/046; B23K 37/0435; B23K 37/0443

USPC .......................... 219/121.6–121.86
See application file for complete search history.

(56) References Cited

U.S. PATENT DOCUMENTS

| | | | | |
|---|---|---|---|---|
| 5,083,070 A | * | 1/1992 | Poupard | G05B 19/41815 318/561 |
| 5,571,430 A | * | 11/1996 | Kawasaki | B23K 26/08 219/121.74 |
| 6,160,615 A | * | 12/2000 | Matsui | G01N 21/9501 356/237.4 |
| 2003/0080100 A1 | * | 5/2003 | Yamazaki | B23K 26/0823 219/121.82 |
| 2013/0061907 A1 | * | 3/2013 | Wang | F24F 5/0042 136/245 |
| 2015/0090769 A1 | * | 4/2015 | Furuta | B23K 37/0461 228/47.1 |

FOREIGN PATENT DOCUMENTS

| | | |
|---|---|---|
| CN | 203289200 U | 11/2013 |
| JP | H08-155768 A | 6/1996 |
| JP | 2009-113045 A | 5/2009 |

(Continued)

*Primary Examiner* — Sang Y Paik
(74) *Attorney, Agent, or Firm* — Winstead PC

(57) ABSTRACT

The present invention makes it unnecessary to dispose a cable for driving a jig, simplifies the structure, and eliminates the restrictions on the operation of a table. Provided is a rotary table device including: a table on which a workpiece is loaded; a rotation mechanism that rotates the table about a predetermined axis, a motor-driven jig that is fixed to the table and clamps the workpiece, and a photoelectric conversion device that is fixed to the table, converts light energy into electric power, and supplies the converted electric power to the jig.

6 Claims, 6 Drawing Sheets

(56) References Cited

FOREIGN PATENT DOCUMENTS

| | | |
|---|---|---|
| JP | 2010-94791 A | 4/2010 |
| JP | 4940107 B2 | 5/2012 |
| JP | 2012-206137 A | 10/2012 |
| WO | WO-2015-052744 A1 | 4/2015 |

* cited by examiner

ROTARY TABLE DEVICE AND LASER MACHINING SYSTEM

CROSS-REFERENCE TO RELATED APPLICATIONS

This application is based on Japanese Patent Application No. 2016-227881, the contents of which are incorporated herein by reference.

TECHNICAL FIELD

The present invention relates to a rotary table device and a laser machining system.

BACKGROUND ART

In a conventionally known rotary table device, the rotation center of a table, on which a workpiece is loaded and fixed with a jig, has a hollow structure, and a cable or the like for driving the jig is disposed therein (for example, see PTL 1).

CITATION LIST

Patent Literature

{PTL 1} Japanese Unexamined Patent Application, Publication No. Hei 8-155768

SUMMARY OF INVENTION

An object of the present invention is to provide a rotary table device and a laser machining system in which there is no need to dispose a cable for driving a jig, the structure is simple, and there is no restriction on the operation of the table.

Solution to Problem

A rotary table device according to an aspect of the present invention includes: a table on which a workpiece is loaded; a rotation mechanism that rotates the table about a predetermined axis; a motor-driven jig that is fixed to the table and clamps the workpiece; and a photoelectric conversion device that is fixed to the table, converts light energy into electric power, and supplies the electric power to the jig.

In the above aspect, the rotary table device may further include, between the photoelectric conversion device and the jig, a power storage device that stores the electric power converted by the photoelectric conversion device.

In the above aspect, the rotary table device may further include, between the photoelectric conversion device and the jig, a jig control unit that controls the jig and is driven by the electric power converted by the photoelectric conversion device.

Another aspect of the present invention is a laser machining system including: any one of the above-described rotary table devices; and a laser-machining robot having a laser machining tool that is attached at the distal end of an arm and emits laser light to machine the workpiece clamped on the table. The laser-machining robot emits the laser light from the laser machining tool to the photoelectric conversion device.

In the above aspect, a camera for observing the operation state of the jig may be attached to the arm.

In the above aspect, the laser machining system may further include a control unit that controls the laser-machining robot. The control unit, before the workpiece is machined, may move the laser-machining robot to a position where the laser machining tool can radiate laser light onto the photoelectric conversion device and cause the laser-machining robot to emit the laser light to make the jig clamp the workpiece with the electric power supplied from the photoelectric conversion device, and, after the workpiece is machined, may move the laser-machining robot to a position where the laser machining tool can radiate laser light onto the photoelectric conversion device and cause the laser-machining robot to emit the laser light to make the jig unclamp the workpiece with the electric power supplied from the photoelectric conversion device.

DESCRIPTION OF EMBODIMENTS

A rotary table device 2 and a laser machining system 1 according to an embodiment of the present invention will be described below with reference to the drawings.

Figure 1:
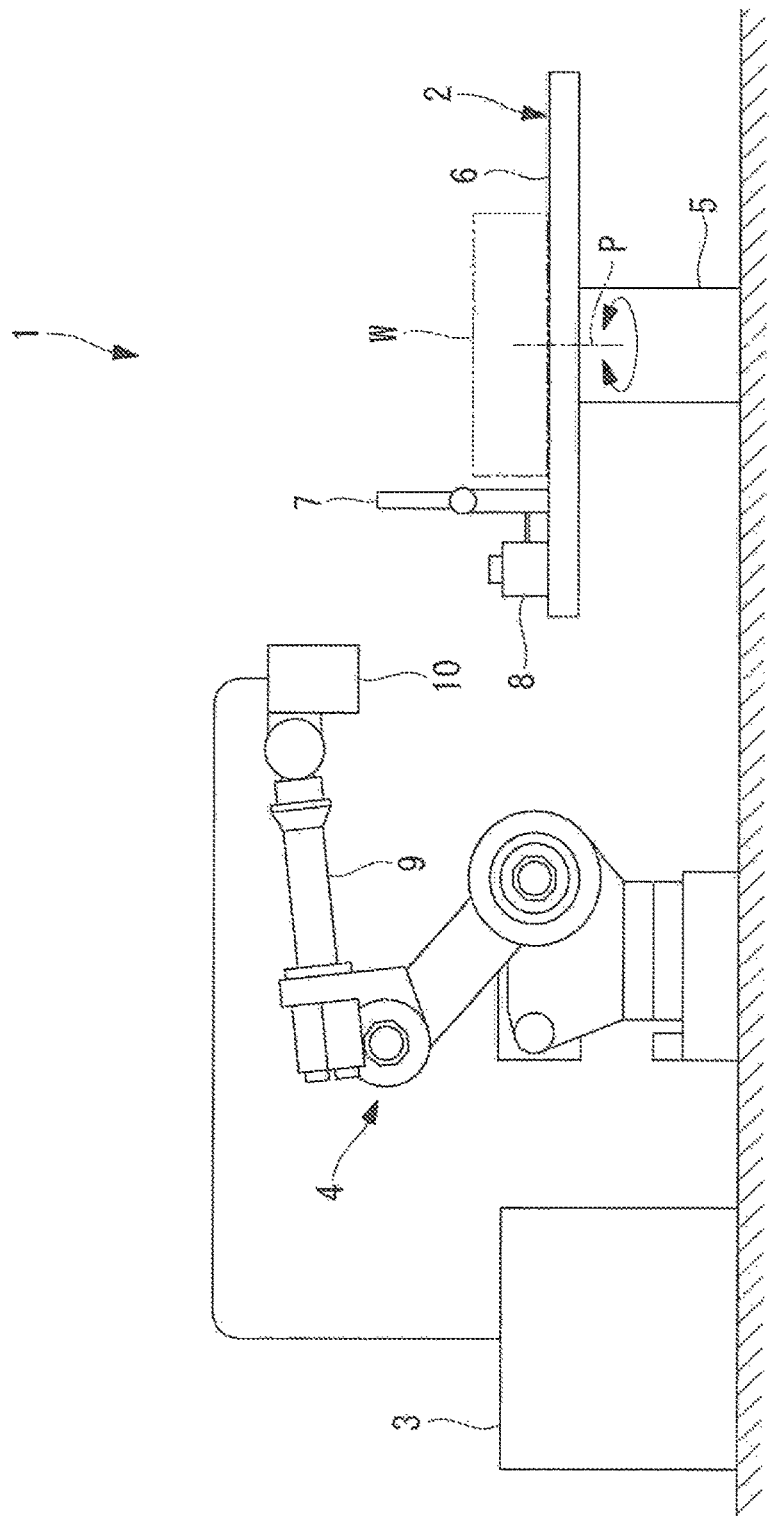
FIG. 1 is a diagram showing the overall configuration of a rotary table device and a laser machining system according to an embodiment of the present invention.

As shown in FIG. 1, the laser machining system 1 according to this embodiment includes the rotary table device 2 on which a workpiece W is loaded, a laser oscillator 3 that generates laser light, and a laser-machining robot 4 that machines the workpiece W with the laser light generated by the laser oscillator 3.

The rotary table device 2 includes a base (rotation mechanism) 5, a table 6 that is supported so as to be rotatable about a vertical axis (axis) P relative to the base 5, a jig 7 fixed to the top of the table 6, and a photoelectric conversion device 8 that supplies power to the jig 7.

Figure 2:
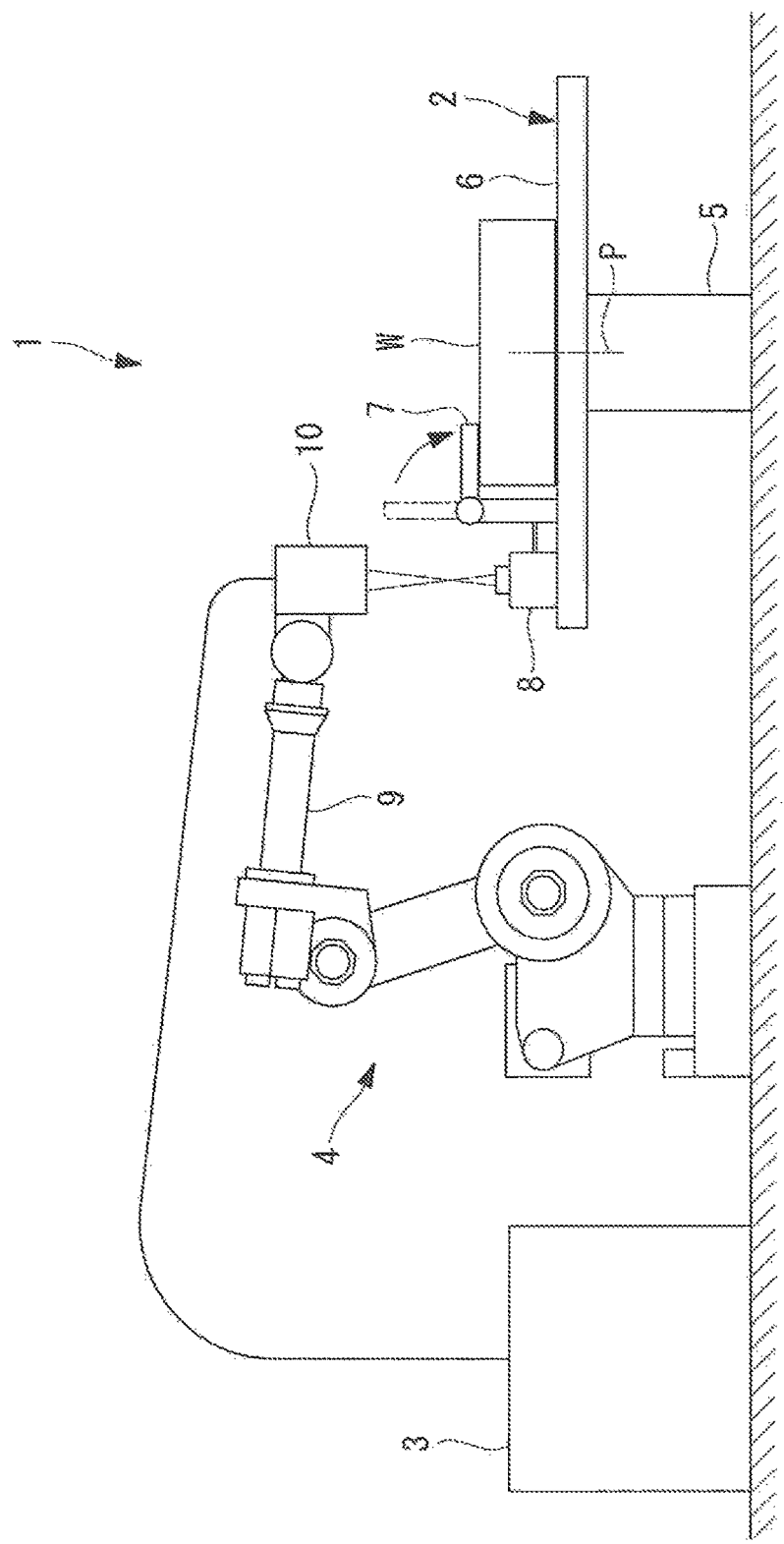
FIG. 2 is a diagram showing the overall configuration of a state in which a workpiece is clamped on a table in the laser machining system in FIG. 1.

The jig 7 is of a motor-driven type that operates by electric power and is movable between a clamping position where it fixes the workpiece W loaded on the table 6, as shown by a solid line in FIG. 2, and an unclamping position where it releases the workpiece W, as shown by a chain line in FIG. 2.

As a result of laser light entering the photoelectric conversion device 8, the photoelectric conversion device 8 converts light energy into electric power according to the intensity of the laser light entering therein and the entrance duration thereof, and outputs the electric power.

The photoelectric conversion device 8 is fixed to, for example, the table 6 with a laser-light-entrance opening facing vertically upward.

The laser-machining robot 4 is, for example, a six-axis multi-joint robot disposed at a side of the rotary table device 2 with a space therebetween. A laser machining tool 10 that emits laser light is attached to the distal end of an arm 9. The laser-machining robot 4 is operable so as to arbitrarily change the position and orientation of the laser machining tool 10 at the distal end of the arm 9 and can arbitrarily adjust the position and direction of the laser light emitted from the laser machining tool 10.

The laser-machining robot 4 has such an operation range that it can emit laser light over an area including the workpiece W and the photoelectric conversion device 8 fixed to the top of the rotary table device 2.

The thus-configured rotary table device 2 and laser machining system 1 according to this embodiment will be described below.

In the rotary table device 2 according to this embodiment, as a result of laser light being radiated on the photoelectric conversion device 8, the photoelectric conversion device 8 converts the light energy into electric power and outputs it, and the output electric power drives the jig 7 fixed to the top of the table 6.

As a result, it is possible to move the jig 7 to the clamping position with the workpiece W being disposed on the table 6 to fix the workpiece W to the table 6 before machining, or to move the jig 7 to the unclamping position to release the workpiece W after machining. Because there is no need to dispose, between the base 5 fixed to the floor and the table 6 that rotates relative to the base 5, a cable for supplying power to the jig 7, it is possible to eliminate a movable cable and to facilitate a cable routing task.

In particular, there is no need to make the table 6 and the base 5 hollow so as to dispose the motor eccentrically and transmit power with power transmission mechanisms, such as gears, or to employ a hollow motor to dispose a cable, and thus, it is possible to simplify the structure of the rotary table device 2 to reduce the cost.

Because there is no need to provide a movable cable, the operation range of the table 6 relative to the base 5 is unlimited, leading to an advantage in that it is possible to freely rotate the table 6 relative to the base 5.

In the laser machining system 1 according to this embodiment, by taking advantage of the characteristic of the laser-machining robot 4 that the position and orientation of the laser machining tool 10 attached to the distal end of the arm 9 can be freely changed, it is possible to dispose the laser machining tool 10 at such a position and orientation that the laser light emitted from the laser machining tool 10 can properly enter the opening in the photoelectric conversion device 8 in the table 6.

Figure 4:
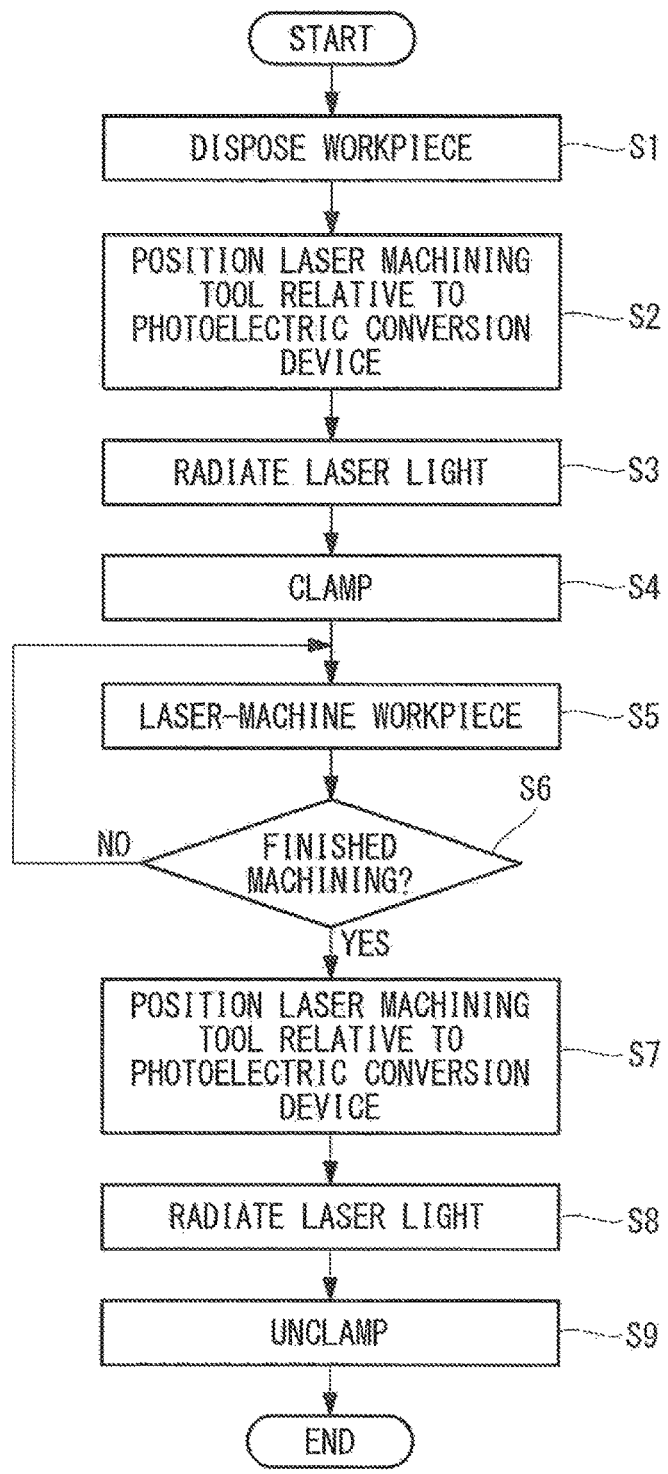
FIG. 4 is a flowchart showing a laser machining process using the laser machining system in FIG. 1.

When the workpiece W is laser-machined with the laser machining system 1, steps shown in FIG. 4 are performed by a control unit (not shown) of the laser-machining robot 4.

First, a workpiece W is disposed on the table 6 of the rotary table device 2 in a state in which clamping with the jig 7 is released (step S1). The laser-machining robot 4 may include a hand for handling the workpiece W, and in that case, the laser-machining robot 4 may also convey the workpiece W onto the table 6.

When the workpiece W is disposed on the table 6, as shown in FIG. 2, the control unit actuates the laser-machining robot 4 to position the laser machining tool 10 relative to the photoelectric conversion device 8 (step S2).

Next, the laser machining tool 10 is actuated, and laser light generated by the laser oscillator 3 is made to enter the opening in the photoelectric conversion device 8 (step S3). As a result, the light energy of the laser light entering the photoelectric conversion device 8 is converted into electric power.

As a result of the electric power generated in the photoelectric conversion device 8 being supplied to the motor-driven jig 7, the jig 7 is moved to the clamping position, as shown by the solid line in FIG. 2, and the workpiece W is fixed to the top of the table 6 (step S4).

Figure 3:
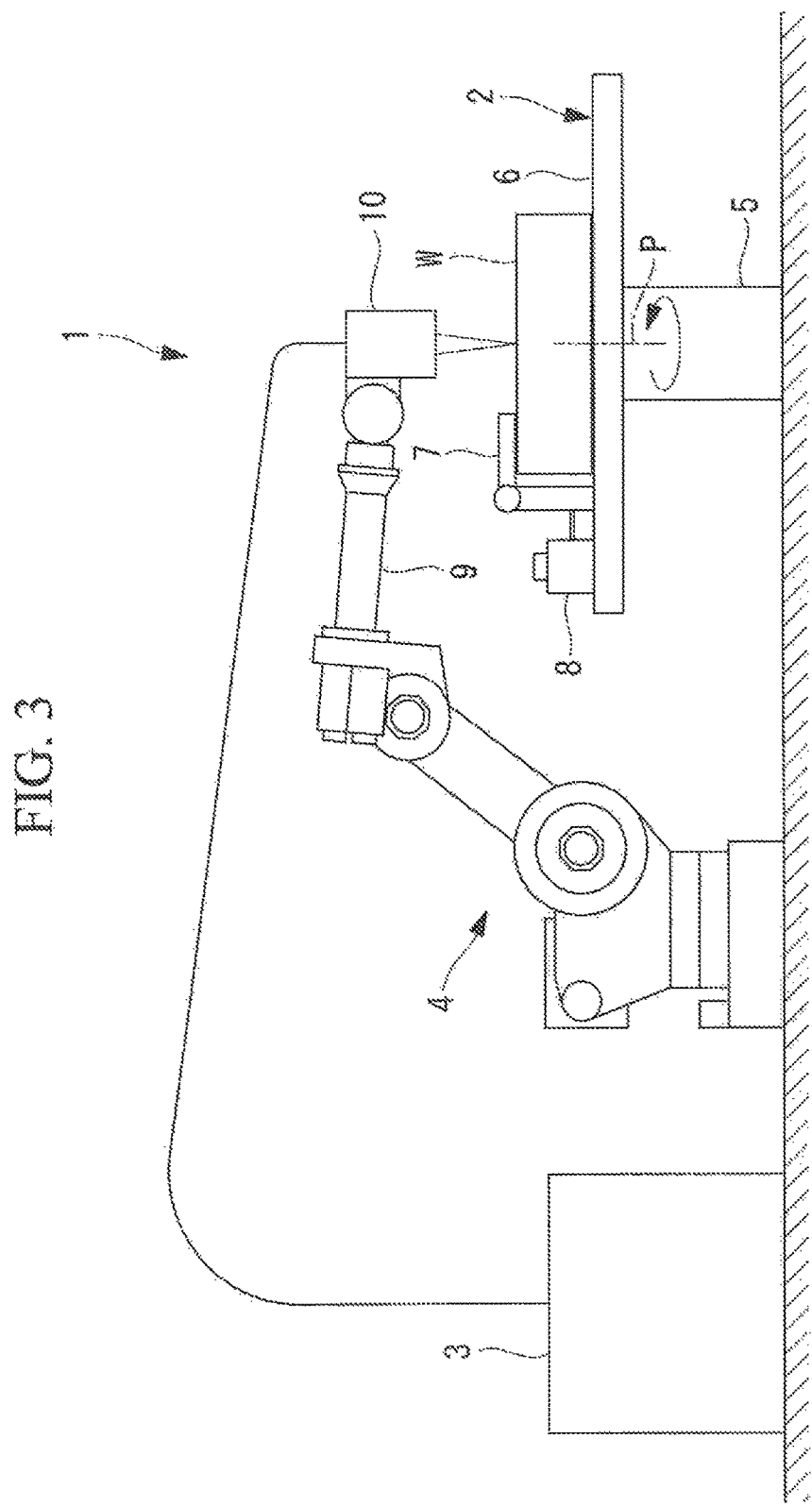
FIG. 3 is a diagram showing the overall configuration of a state in which the workpiece on the table is laser-machined with the laser machining system in FIG. 1.

Thereafter, as shown in FIG. 3, the laser-machining robot 4, the laser machining tool 10, and the rotary table device 2 are operated, and the workpiece W is machined with the laser light emitted from the laser machining tool 10, while the workpiece W fixed to the table 6 is rotated (step S5).

It is determined whether the machining is completed (step S6). After the machining is completed, the rotary table device 2 is stopped at a predetermined stopping position, and, as shown in FIG. 2, the laser-machining robot 4 is actuated to position, again, the laser machining tool 10 relative to the photoelectric conversion device 8 (step S7).

Then, the laser machining tool 10 is actuated to make the laser light generated in the laser oscillator 3 enter the opening in the photoelectric conversion device 8 (step S8). As a result, the light energy of the laser light entering the photoelectric conversion device 8 is converted into electric power and is supplied to the motor-driven jig 7. As a result, the jig 7 is moved to the unclamping position, as shown by the chain line in FIG. 2 (step S9), and the workpiece W fixed to the top of the table 6 is released.

As described above, with the laser machining system 1 according to this embodiment, the movable cable is not required, and the laser-machining robot 4 moves the laser machining tool 10, which supplies the light energy to the photoelectric conversion device 8 fixed to the table 6, which moves without restriction. Hence, no matter in what orientation the table 6 is disposed, it is possible to properly supply the light energy to generate electric power and perform clamping and unclamping with the jig 7.

Figure 5:
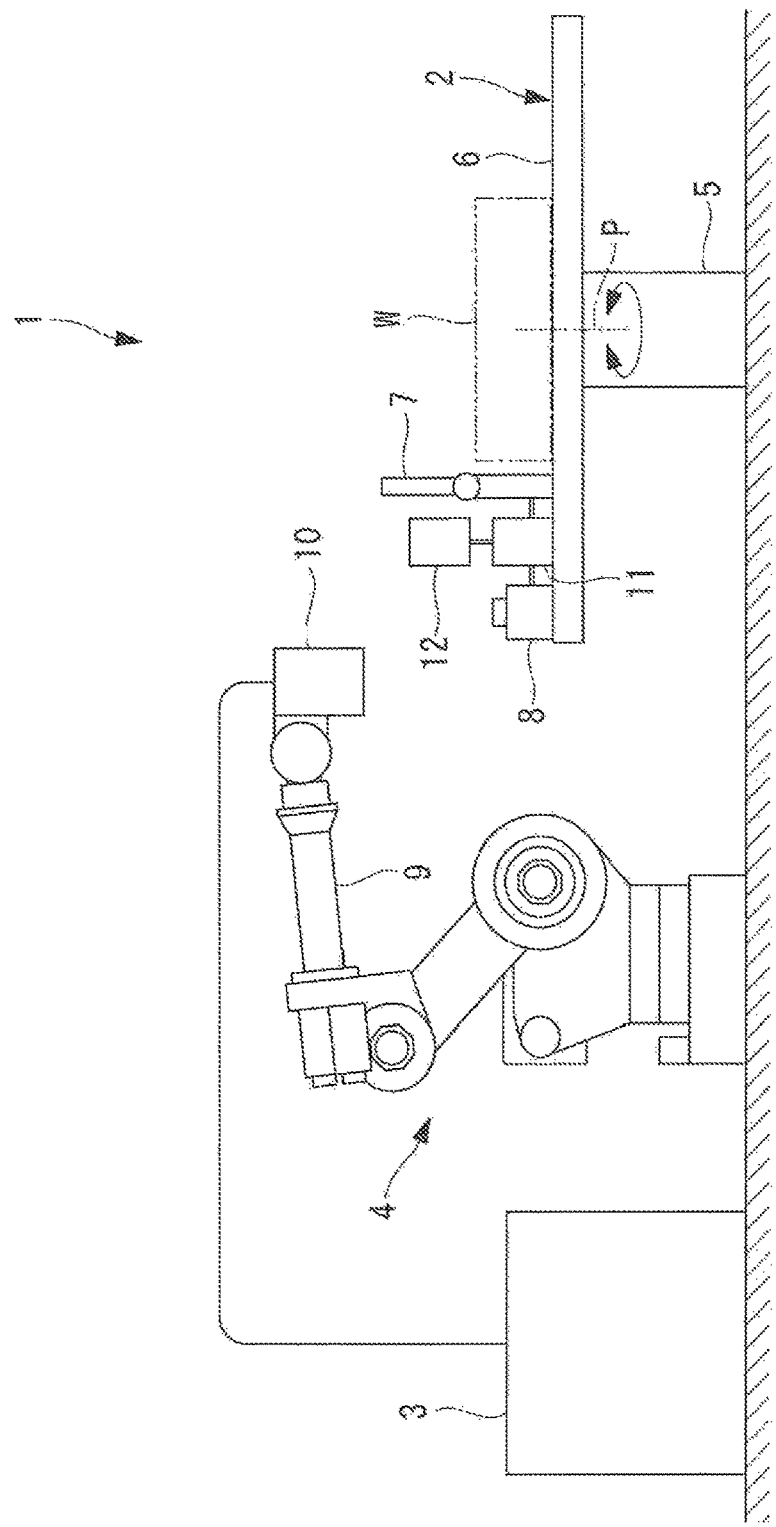
FIG. 5 is a diagram showing the overall configuration of a first modification of the laser machining system in FIG. 1.

As shown in FIG. 5, in the rotary table device 2 and laser machining system 1 according to this embodiment, a power storage device 11 that stores the electric power generated in the photoelectric conversion device 8 and which can operate the jig 7 for a certain period without supplying power, may be disposed between the photoelectric conversion device 8 and the jig 7. In that case, for example, it is preferable to provide, on the table 6, a jig control unit 12 that controls the operation of the jig 7 with radio I/O signals output from the laser-machining robot 4 or the control unit thereof (not shown).

A camera (not shown) for monitoring the actuation state of the jig 7 may be provided at the distal end of the arm 9 of the laser-machining robot 4. The clamping state or the unclamping state may be determined on the basis of the state of the jig 7 captured by the camera, and, when clamping or unclamping is not properly performed, the light energy may be supplied again to the photoelectric conversion device 8 to move the jig 7 again.

For ease of explanation, although an example case where a single jig, namely, the jig 7 is provided on the table 6 has been described, the present invention is not limited thereto and may also be applied to a case where a plurality of jigs 7 are provided or a jig 7 that operates in a complicated way is provided.

Figure 6:
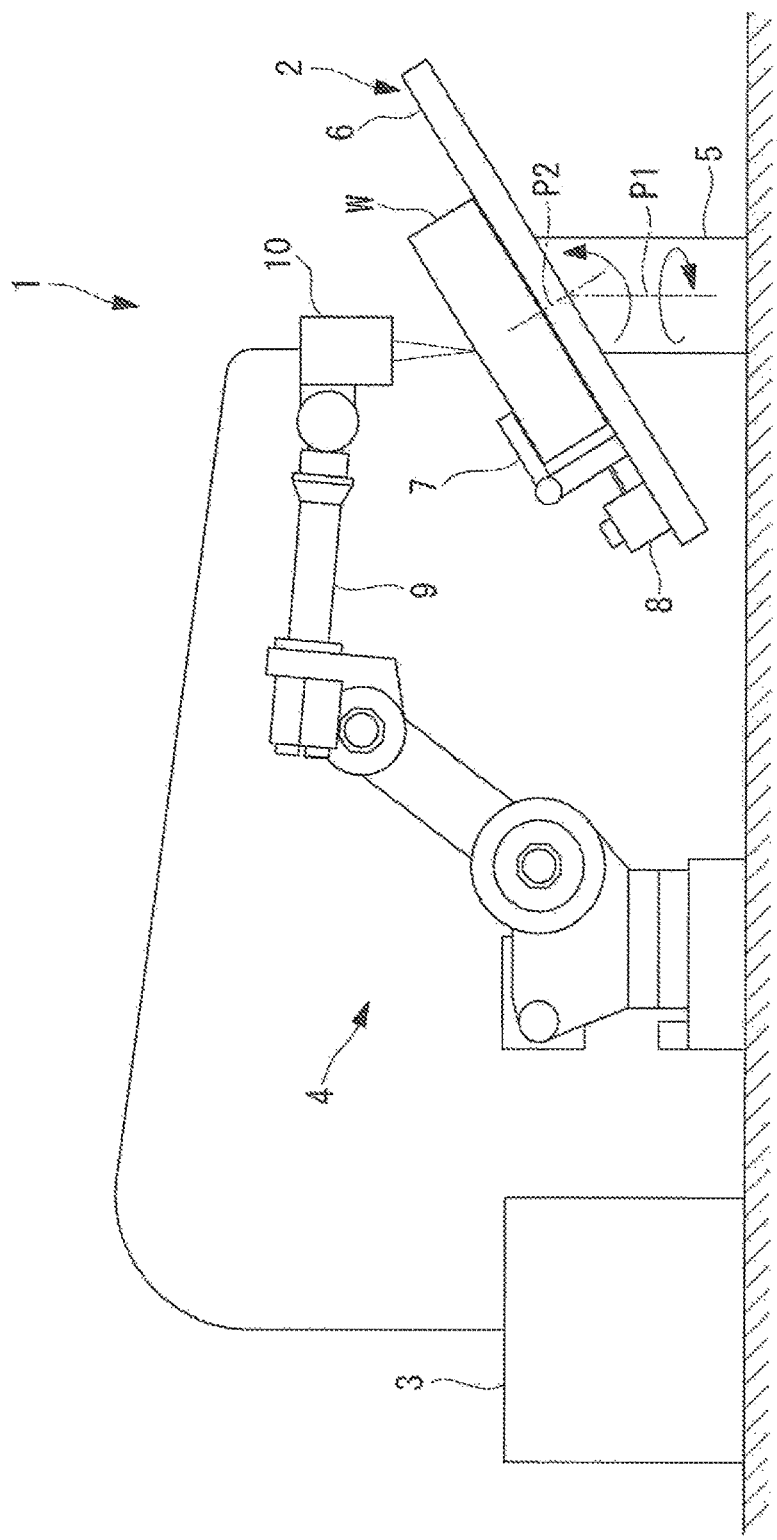
FIG. 6 is a diagram showing the overall configuration of a second modification of the laser machining system in FIG. 1.

For the rotary table device 2, besides a device that is configured to rotate the table 6 about the vertical axis P, a device that has, as shown in FIG. 6, a plurality of axes P1 and P2 and that can change the position and orientation of the workpiece W with high flexibility may be employed.

As a result, the following aspect is read from the above described embodiment of the present invention.

A rotary table device according to an aspect of the present invention includes: a table on which a workpiece is loaded; a rotation mechanism that rotates the table about a predetermined axis; a motor-driven jig that is fixed to the table and clamps the workpiece; and a photoelectric conversion device that is fixed to the table, converts light energy into electric power, and supplies the electric power to the jig.

According to this aspect, by supplying light energy from the outside to the photoelectric conversion device, converting the light energy into electric power, and supplying the generated electric power to the jig, the motor-driven jig can be actuated to clamp or unclamp the workpiece on the table. By fixing the photoelectric conversion device to the table, even when the rotation mechanism is actuated to change the angle of the table, there is no need to dispose, between a base and the table, a cable or the like for supplying electric power to the jig, and thus, it is possible to eliminate the restrictions on the operation of the table.

In the above aspect, the rotary table device may further include, between the photoelectric conversion device and the jig, a power storage device that stores the electric power converted by the photoelectric conversion device.

This configuration enables the electric power converted by the photoelectric conversion device to be accumulated in the power storage device and used to operate the motor-driven jig, depending on the necessity.

In the above aspect, the rotary table device may further include, between the photoelectric conversion device and the jig, a jig control unit that controls the jig and is driven by the electric power converted by the photoelectric conversion device.

With this configuration, because the jig control unit for controlling the jig is driven by the electric power obtained by converting the radiated light energy with the photoelectric conversion device, it is possible to accurately operate either a plurality of jigs or a jig that operates in a complicated way.

Another aspect of the present invention is a laser machining system including: any one of the above-described rotary table devices; and a laser-machining robot having a laser machining tool that is attached at the distal end of an arm and emits laser light to machine the workpiece clamped on the table. The laser-machining robot emits the laser light from the laser machining tool to the photoelectric conversion device.

According to this aspect, by operating the laser-machining robot to move the laser machining tool to the position of the photoelectric conversion device, and by causing the laser machining tool to radiate laser light onto the photoelectric conversion device, the light energy is converted into electric power by the photoelectric conversion device, and the motor-driven jig is driven. As a result of the jig being driven, the workpiece can be clamped or unclamped. Because the operation of the table by the rotary table device is not inhibited by a cable for driving the jig, the table can be freely operated, and, in combination with the operation of the laser-machining robot, complicated machining can be easily performed.

In the above aspect, a camera for observing the operation state of the jig may be attached to the arm.

With this configuration, the operation state of the jig is observed with the camera, and, by performing laser machining, removal, or the like of the workpiece while clamping or unclamping with the jig is reliably performed, it is possible to perform highly precise laser machining or removal of the workpiece.

In the above aspect, the laser machining system may further include a control unit that controls the laser-machining robot. The control unit, before the workpiece is machined, may move the laser-machining robot to a position where the laser machining tool can radiate laser light onto the photoelectric conversion device and cause the laser-machining robot to emit the laser light to make the jig clamp the workpiece with the electric power supplied from the photoelectric conversion device, and, after the workpiece is machined, may move the laser-machining robot to a position where the laser machining tool can radiate laser light onto the photoelectric conversion device and cause the laser-machining robot to emit the laser light to make the jig unclamp the workpiece with the electric power supplied from the photoelectric conversion device.

With this configuration, as a result of the laser light from the laser machining tool being radiated onto the photoelectric conversion device, it is possible to operate the jig and control the jig with the laser-machining robot.

REFERENCE SIGNS LIST 1 laser machining system
2 rotary table device
4 laser-machining robot
5 base (rotation mechanism)
6 table
7 jig
8 photoelectric conversion device
10 laser machining tool
11 power storage device
12 jig control unit
P vertical axis (axis)
P1, P2 axis
W workpiece

The invention claimed is:
1. A rotary table device comprising:
a table on which a workpiece is loaded;
a rotation mechanism that rotates the table about a predetermined axis;
a motor-driven jig that is fixed to the table and clamps the workpiece;
a photoelectric conversion device that is fixed to the table, converts light energy into electric power, and supplies the electric power to the jig; and
wherein the photoelectric conversion device rotates about the predetermined axis together with the table and the jig.
2. The rotary table device according to claim 1, further comprising, between the photoelectric conversion device and the jig, a power storage device that stores the electric power converted by the photoelectric conversion device.
3. The rotary table device according to claim 1, further comprising, between the photoelectric conversion device and the jig, a jig control unit that controls the jig and is driven by the electric power converted by the photoelectric conversion device.
4. A laser machining system comprising:
the rotary table device according to claim 1; and
a laser-machining robot having a laser machining tool that is attached at the distal end of an arm and emits laser light to machine the workpiece clamped on the table,
wherein the laser-machining robot emits the laser light from the laser machining tool to the photoelectric conversion device.
5. The laser machining system according to claim 4, wherein a camera for observing the operation state of the jig is attached to the arm.

6. The laser machining system according to claim 4, further comprising a control unit that controls the laser machining robot, wherein the control unit, before the workpiece is machined, moves the laser-machining robot to a position where the laser machining tool can radiate laser light onto the photoelectric conversion device and causes the laser-machining robot to emit the laser light to make the jig clamp the workpiece with the electric power supplied from the photoelectric conversion device and, after the workpiece is machined, moves the laser-machining robot to a position where the laser machining tool can radiate laser light onto the photoelectric conversion device and causes the laser-machining robot to emit the laser light to make the jig unclamp the workpiece with the electric power supplied from the photoelectric conversion device.

* * * * *